United States Patent Office 3,251,984
Patented May 17, 1966

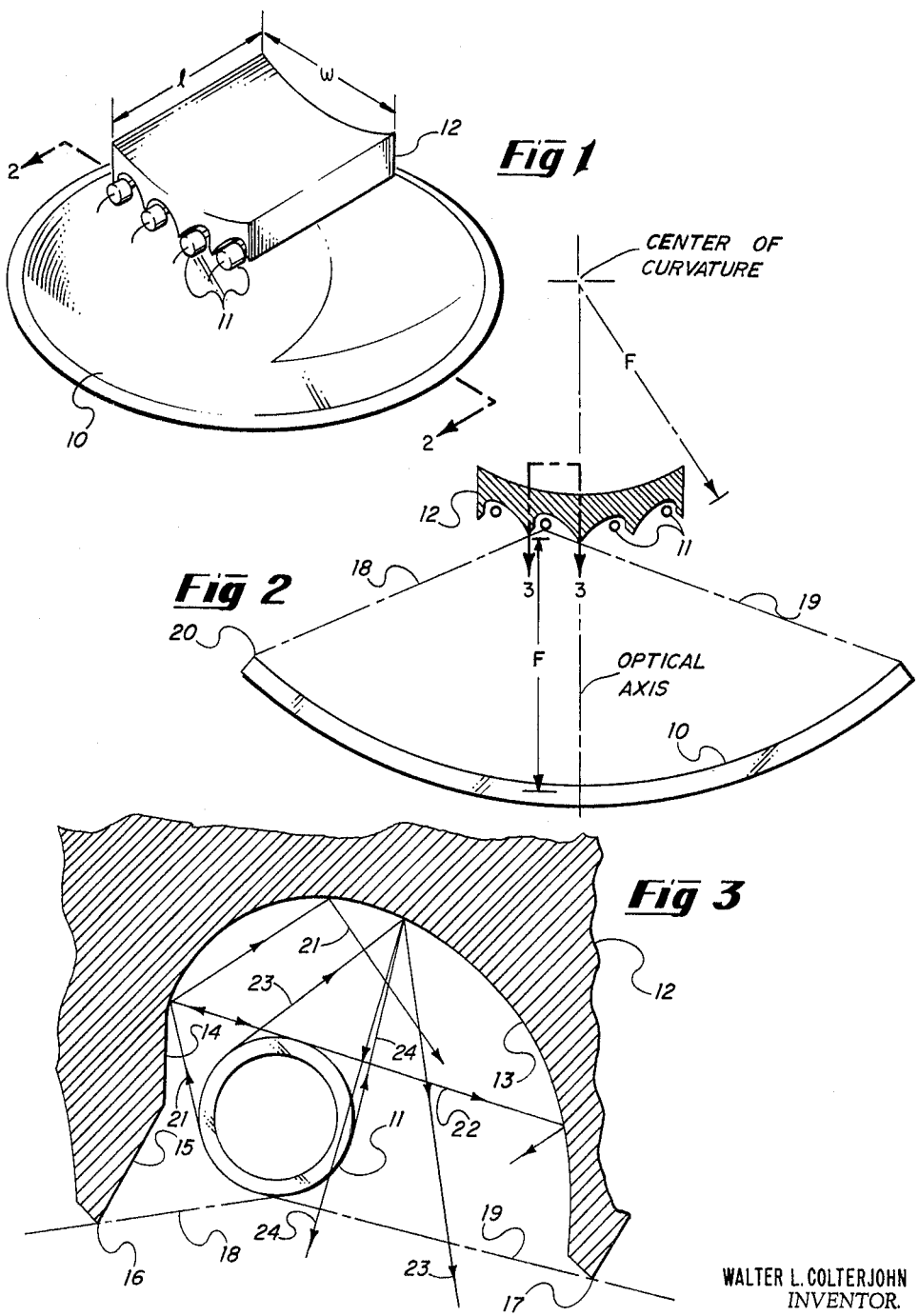
May 17, 1966    W. L. COLTERJOHN    3,251,984
ILLUMINATION OPTICAL SYSTEM FOR AERIAL PHOTOGRAPHY
Filed Feb. 18, 1963
WALTER L. COLTERJOHN
INVENTOR.
BY Jacques L. Meister
AGENT

3,251,984
ILLUMINATION OPTICAL SYSTEM FOR
AERIAL PHOTOGRAPHY
Walter L. Colterjohn, Elmwood Park, Ill., assignor to Chicago Aerial Industries, Inc., Barrington, Ill., a corporation of Delaware
Filed Feb. 18, 1963, Ser. No. 259,110
7 Claims. (Cl. 240—1.3)

This invention relates generally to an illumination optical system and more particularly to an illumination optical system for aerial electronic flash photography.

Gas discharge apparatus providing a so-called "electronic flash" is a well-known type of illumination equipment which has been used in non-aerial photographic applications for many years. Among the features of electronic flash equipment usually cited as advantages are the capability of high repetition rates and high intensity short duration flashes achieved without pyrotechnic action. Among the disadvantages of this equipment have been its heavy high voltage power supply and its inability to deliver sufficient luminous flux uniformly distributed over the area to be photographed. Despite the advantageous features of electronic flash, the disadvantages have largely resulted in the frustration of efforts made to apply it to aerial photography.

Since there are many areas of aerial photography where the advantages of electronic flash would prove desirable, there have been persistant efforts to overcome the disadvantages. These efforts have included better flash tubes and lighter weight power supplies but, little effort has heretofore been expended on improving the efficiency of utilization of the luminous flux available.

Therefore, a general object of the present invention is to provide a new and improved illumination optical system for use in aerial flash photography.

It is another object of this invention to provide an improved illumination optical system for flash photography which directs the emitted luminous flux more efficiently than systems heretofore in use.

Yet another object of this invention is to provide an illumination optical system for photography which provides a uniform distribution of luminous flux in the area to be photographed.

An important object of the invention is to provide an illumination optical system for electronic flash photography which reduces the radiation incident on the flashtube.

Still another object of the invention is to provide an illumination optical system with characteristics which enhance flashtube life.

The above and other objects of the invention are achieved in accordance with one illustrative embodiment of the present invention by utilizing a novel forward reflecting element in combination with other reflecting elements. In the principal embodiment of this invention, the forward reflector comprises a right involute cylindrical reflector generated about the cylindrical flash source. Then, by configurating the forward reflector-flashtube combination in the shape of the area to be photographed and by utilizing an appropriate focal length for the principal mirror, the advantages of the invention are realized. These and other novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

FIGURE 1 is a perspective view of the inventive optical system with certain parts increased in size for illustration purposes; and FIGURE 2 is a section taken at 2—2 in FIGURE 1; and
FIGURE 3 is an enlarged fragment of the cross section of FIGURE 2 taken at 3—3 in FIGURE 2.

Referring now to the drawings, and more particularly to FIGURE 1 thereof, there is illustrated an overall view in perspective of the inventive arrangement. A plurality of electronic flashtubes 11 is particularly positioned relative to a forward reflector 12 and a paraboloidal principal mirror 10. In FIGURES 1 and 2 the size of both the flashtubes 11 and the forward reflector 12 have been exaggerated with respect to the size of the principal reflector 10 to facilitate illustration. Generally, the forward reflector 12, lamps 11, and their supporting structure together obscure less than 15% of the area of the principal reflector 10. Since the supporting structure for the flashtubes relative to the forward reflector 12 and for that reflector relative to the principal mirror 10 are conventional and form no part of the present invention and since its appearance in the drawing would obscure important features, it has not been illustrated. The physical arrangement of the invention is best shown in FIGURES 2 and 3.

In accord with a feature of this invention the plurality of flashtubes employed are arranged in an arc of radius F. about the center of curvature of the principal reflector 10. Those skilled in the art will appreciate that arranging the flashtubes on such an arc will minimize defocusing of the flashtubes when the principal reflector 10 is a spherical or paraboloidal reflector of focal length F. Where the reflector 10 is not spherical but paraboloidal, the tubes would ideally be situated on a line other than an arc. However, for the condition where the tubes are relatively closely spaced to the axis of the paraboloid, an arc provides a sufficiently close approximation to the required curve and, is mechanically easier to construct.

In another and recommended construction where optical properties must be enhanced to the maximum possible extent, the individual flashtubes and their respective forward reflectors are curved in a transverse direction to the arc described by radius F in FIGURE 2. This curvature is adjusted so that the flashtubes entire length falls either on a spherical surface of radius F or, on the surface of a paraboloid related to that of the principal reflector. While optical properties are enhanced by such an arrangement, costs are also considerably increased. When the forward reflector is curved in but a single direction, it is advantageously manufactured as an extrusion. When it is double curved, it is necessary that other higher cost processes be employed.

The number and size of the flashtubes utilized is dependent upon the amount of luminous flux required to be imaged at the ground. Once these factors have been determined, the required number of tubes may be configured into the inventive illumination optical system. Advantageously the forward reflector 12 comprises a number of reflecting surfaces equal to the number of flashtubes utilized. In one embodiment conforming with the inventive principles, each of the reflecting surfaces is a modified right involute cylinder generated about the cross section of the flashtube 11. While the involute could be constructed around a smaller or larger section than the actual cross-section of the flashtube, it generally has been found advantageous to utilize the cross section of the flash tube or some smaller cross-section as a locus for generation. Considerations involved in the involutes' generation are discussed further below.

It is a feature of this invention that when utilizing an involute cylinder as the reflecting surface of the forward reflector with the flashtubes' cross-section utilized as the locus of generation of the involute, substantially all of the forward light emitted from the flashtube will be reflected to the principal reflector 10 without passing thru the flashtube. Direction of the forward light in this manner results in the accomplishment of a number of the inventive features.

At the time of the flash the ionized gas within the flashtube is opaque and hence, any light reflected back upon the tube will either be scattered or absorbed resulting in a loss of efficiency. As can be seen by tracing rays 21, 22, 23 and 24 in FIGURE 3, use of a right involute cylindrical reflecting surface in the forward reflector, results in the majority of the forward radiation being reflected around the flashtube without passing through the tube. Only a portion of the rays impinging on the straight line portion 14 of the reflecting surface are reflected back upon the tube. As discussed below, the involute reflecting surface was modified at 14 to accommodate manufacturing processes.

Another inventive feature is achieved by redirecting the forward radiation which otherwise would not be imaged upon the format area. As will be apparent to those versed in the arts, the only useful portion of the forward radiation in systems without a forward reflector, is the flux contained in the solid angle subtended by the format area; i.e. the useful flux will be inversely proportional to the square of the distance between the format area and the source. In aerial photographic systems, even at minimum altitudes, this distance is always large enough to make the useful amount of flux negligible. By redirecting substantially all of the forward radiation so that the principal loss in the system is due only to obscuration of the principal reflector, large increases in efficiencies are possible. These increases in efficiency are enhanced by the inventive use of the involute shaped forward reflector, for this shape combines small size with the feature of directing radiation around the flashtube. Since the efficiency of the system goes up in direct proportion to decreases in size of the forward reflector, small size is highly desirable.

Another advantageous feature of the invention achieved by directing the forward radiation in a manner which avoids passing it thru the flashtubes, is an increased service life for the tubes. Whenever radiation is redirected upon the tube, tube temperatures rise and life is shortened.

For construction purposes the right involute cylindrical reflecting surface 13 is modified by terminating it in a tangential straight line portion 14 and 15. The tips 16 and 17 of each involute cylindrical reflecting surface are determined by a consideration of that reflecting surfaces location relative to the principal reflector 10. For maximum efficiency and minimum dispersion of light to the side of the optical system, tangential lines 18 and 19 are constructed between the flashtube and the rim 20 of the reflector 10. The tips 16 and 17 of the involute reflecting surface 13 are then adjusted lengthwise so that they lie upon the respective tangential lines 18 and 19.

It is an advantageous feature of this invention that the size of the forward reflector 12 may be made proportional to the equivalent dimensions of the format area of the camera used to effect the photography while at the same time distributing the luminous flux in a manner which yields uniform density in the photograph. Also, by choosing a principal reflector 10 whose focal length F with respect to either the dimension "$l$" or "$w$" of the forward reflector 12 is in the same ratio as the focal length $F_1$ to the equivalent format dimension $l_1$ or $w_1$ of the camera, the area illuminated will very nearly be the same as the area which the camera lens images upon the film. By this advantageous construction, the overall efficiency of the system is materially increased since substantially all of the light directed by the principal reflector 10 can be made to fall within the rectangular area imaged by the camera lens.

As shown in FIGURES 1 and 2 of the drawing, a plurality of flashtubes have been employed. It has been found that when two or more flashtubes are employed and when these tubes are very slightly de-focused that "hot spots" in the format area are avoided. This avoidance of "hot spots" is enhanced when two or more of the inventive systems are used together. When two inventive systems are employed in this manner, the flashtubes of the two systems are positioned at right angles to each other. In one embodiment employing two of the inventive systems with each system utilizing four flashtubes as illustrated in FIGURE 1, a sensitive Spectra-Pritchard spot photometer was unable to detect any substantial discontinuities in the distribution of luminous flux on a target located 100 feet from the system.

In one inventive embodiment employing four of the inventive illumination optical systems, it has been found possible to obtain good photographic coverage at night with a 4½″ camera on tri-x film with a 6 inch focal length f2.8 lens. In this embodiment each of the four flashtubes of each system were General Electric part number FT–91 and were flashed with a 200 watt-second per tube input. The forward reflector for each of the systems measured approximately 3 inches square and the principal reflector was a 14 inch diameter paraboloid with a 4¾ inch focal length. This system achieved approximately 65 percent efficiency, that is, 65% of the lamps luminous output was focused on the ground within the camera format area.

Thus far the involute form of the forward reflecting surface has proven to be the most efficient when both redirection of the forward light and avoidance of reflecting through the flashtube are attempted to be accomplished in a small space. All other forward reflector designs have proven to be either less effective as a reflector or more space consuming. The advantages of the involute reflector form have not yet been fully explored, but indications are that it may be possible to use a considerably smaller form than presently used with a corresponding increase in efficiency. It appears now as if the ultimate reduction in size will be achieved when the involute is generated around the cross-section of the arc itself.

The specific example herein shown and described is illustrative only. Various changes in structure will, no doubt, occur to those skilled in the art; and these changes are to be understood as forming a part of this invention insofar as they fall within the spirit and scope of the appended claims.

I claim:

1. An illumination optical system for use with a camera of format size $l_1 w_1$ and focal length $F_1$ comprising,
   a paraboloidal mirror of focal length F,
   a forward reflector of size $lw$ comprising at least one right involute cylindrical reflector, the cylinder of generation of the involute cylindrical surface being perpendicular to a circular arc of radius F swung about the center of curvature located on the optical axis of the paraboloidal mirror and passing thru the focus thereof, said forward reflector being positioned between said center of curvature and said paraboloidal mirror, the ratio of size $lw$ to F being substantially identical to the ratio $l_1 w_1$ to $F_1$, and a flash tube mounted within each right involute cylindrical reflector and in substantially coaxial alignment with said cylinders of generation.

2. An illumination optical system for use with a camera of format size $l_1 w_1$ and focal length $F_1$ comprising,
   a principal reflector of focal length F,
   a plurality of flash tubes arranged with their axes parallel to each other and perpendicular to a circular arc of radius F swung about the principal reflector's axial center of curvature located on the optical axis, the arc passing thru the axis of the principal reflector at its focal point, said flash tubes being positioned between said center of curvature and said principal reflector, and an individual forward reflector element partially surrounding each of the flash tubes, individual ones of said forward reflector elements being shaped and disposed with respect to its paired flash tube to cause substantially all radiant energy emanated from said flash tube and reflected by said forward reflector element to impinge upon said principal reflector without being reflected thru said flash tube and to prevent the escape of radiant energy that does not impinge upon either said principal reflector or one of said forward reflector elements, said individual forward reflector elements being contiguous and of combined size $lw$, the ratio of size $lw$ to F being substantially identical to the ratio $l_1w_1$ to $F_1$.

3. An illumination optical system in accord with claim 2 wherein individual ones of said forward reflector elements comprise a modified right involute cylinder generated about a particular cross-section of the flashtube.

4. An illumination optical system in accord with claim 2 wherein said principal mirror is spherical.

5. An illumination optical system employing electronic flash tubes and for use with a camera of format size $l_1w_1$ and focal length $F_1$ comprising, a paraboloidal principal mirror of focal length F, a plurality of flashtubes arranged with their axes parallel to each other and perpendicular to a circular arc of radius F whose center coincides with the principal mirror's axial center of curvature and located on the optical axis thereof, said flash tubes being positioned between said center of curvature and said paraboloidal mirror and an individual forward reflector element paired with each of the flashtubes, each of said individual forward reflector elements comprising a modified right involute cylinder generated about its paired flashtube, said individual forward reflector elements being joined to form a forward reflector of overall size $lw$, the ratio of size $lw$ to F being substantially identical to the ratio $l_1w_1$ to $F_1$.

6. An illumination optical system for use with a camera of format size $l_1w_1$ and focal length $F_1$ comprising, a principal mirror of focal length F, a plurality of electronic flash tubes disposed in front of said principal mirror and arranged with their axes perpendicular to a circular arc of radius F swung about said principal mirror's axial center of curvature located on the optical axis, said arc passing thru the axis of said principal mirror at its focal point, said flash tubes being positioned between said center of curvature and said principal mirror, and forward reflector means of size $lw$ having individual reflecting surfaces partially surrounding each of said flash tubes, the ratio of size $lw$ to F being substantially identical to the ratio $l_1w_1$ to $F_1$.

7. An illumination optical system in accord with claim 6 wherein each of the reflecting surfaces of the forward reflector means comprises a modified right involute cylinder generated about a particular section of its paired flashtube.

References Cited by the Examiner

UNITED STATES PATENTS

| | | |
|---|---|---|
| 2,501,405 | 3/1950 | Noel _____ 240—1.3 |
| 2,846,565 | 8/1958 | Binkley et al. ___ 240—41.35 X |
| 3,127,113 | 3/1964 | Tomkinson _____ 240—1.3 |

FOREIGN PATENTS

| | | |
|---|---|---|
| 244,865 | 5/1963 | Australia. |
| 336,779 | 10/1930 | Great Britain. |
| 799,750 | 6/1936 | France. |
| 275,840 | 6/1913 | Germany. |

EVON C. BLUNK, *Primary Examiner.*

NORTON ANSHER, *Examiner.*

J. F. PETERS, *Assistant Examiner.*